US011270698B2

(12) United States Patent
Kumar et al.

(10) Patent No.: US 11,270,698 B2
(45) Date of Patent: *Mar. 8, 2022

(54) PROACTIVE COMMAND FRAMEWORK

(71) Applicant: Amazon Technologies, Inc., Seattle, WA (US)

(72) Inventors: Anjishnu Kumar, Seattle, WA (US); Xing Fan, Redmond, WA (US); Arpit Gupta, Seattle, WA (US); Ruhi Sarikaya, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 157 days.

This patent is subject to a terminal disclaimer.

(21) Appl. No.: 16/550,639

(22) Filed: Aug. 26, 2019

(65) Prior Publication Data
US 2020/0058300 A1    Feb. 20, 2020

Related U.S. Application Data

(63) Continuation of application No. 15/703,268, filed on Sep. 13, 2017, now Pat. No. 10,395,655.

(51) Int. Cl.
*G10L 15/22* (2006.01)
*G10L 13/00* (2006.01)
(Continued)

(52) U.S. Cl.
CPC .............. *G10L 15/22* (2013.01); *G06F 40/30* (2020.01); *G06N 5/022* (2013.01); *G10L 13/00* (2013.01); *G10L 15/14* (2013.01); *G10L 15/1815* (2013.01); *G10L 17/00* (2013.01); *G06F 40/295* (2020.01); *G10L 2015/223* (2013.01)

(58) Field of Classification Search
CPC . G10L 15/1822; G10L 15/1815; G10L 15/22; G10L 15/18; G10L 15/183; G10L 15/265; G10L 15/30; G10L 15/26; G10L 25/48; G06F 40/295; G06F 40/35; G06F 40/20; G06F 40/40; G06F 40/106; G06F 40/186; G06F 40/30; G06F 3/167; G06F 2203/0381; G06F 16/3329;
(Continued)

(56) References Cited

U.S. PATENT DOCUMENTS 5,748,841 A * 5/1998 Morin ....................... G06F 3/16
704/257
8,265,939 B2 * 9/2012 Kanevsky ........... G10L 15/1822
704/275
(Continued)

*Primary Examiner* — Vijay B Chawan
(74) *Attorney, Agent, or Firm* — Pierce Atwood LLP

(57) ABSTRACT

Techniques for determining a command or intent likely to be subsequently invoked by a user of a system are described. A user inputs a command (either via a spoken utterance or textual input) to a system. The system determines content responsive to the command. The system also determines a second command or corresponding intent likely to be invoked by the user subsequent to the previous command. Such determination may involve analyzing pairs of intents, with each pair being associated with a probability that one intent of the pair will be invoked by a user subsequent to a second intent of the pair. The system then outputs first content responsive to the first command and second content soliciting the user as to whether the system to execute the second command.

20 Claims, 12 Drawing Sheets

(51) Int. Cl.
G10L 15/14 (2006.01)
G10L 15/18 (2013.01)
G06N 5/02 (2006.01)
G06F 40/30 (2020.01)
G10L 17/00 (2013.01)
G06F 40/295 (2020.01)

(58) Field of Classification Search
CPC ........... G06F 16/90332; G06F 16/9535; G06F 16/248; G06F 3/165; G06N 20/00; G06N 7/005; G06N 5/022
USPC .... 704/275, 270.1, 270, 257, 251, 235, 249, 704/277, 9
See application file for complete search history.

(56) References Cited

U.S. PATENT DOCUMENTS

| | | | | |
|---|---|---|---|---|
| 8,560,325 | B2* | 10/2013 | Kanevsky | G10L 15/1822 704/275 |
| 9,575,963 | B2* | 2/2017 | Pasupalak | G06F 40/295 |
| 10,332,517 | B1* | 6/2019 | Wang | G06F 3/167 |
| 10,395,655 | B1* | 8/2019 | Kumar | G10L 15/14 |
| 2008/0221903 | A1* | 9/2008 | Kanevsky | G10L 15/1822 704/275 |
| 2012/0265528 | A1* | 10/2012 | Gruber | G10L 15/183 704/235 |
| 2013/0006637 | A1* | 1/2013 | Kanevsky | G10L 15/1822 704/251 |
| 2014/0095162 | A1* | 4/2014 | Kanevsky | G10L 15/1815 704/249 |
| 2014/0218372 | A1* | 8/2014 | Missig | G06F 3/167 345/473 |
| 2014/0297284 | A1* | 10/2014 | Gruber | G10L 15/18 704/257 |
| 2015/0066479 | A1* | 3/2015 | Pasupalak | G06F 40/40 704/9 |
| 2015/0356463 | A1* | 12/2015 | Overell | G06N 20/00 706/12 |
| 2017/0115956 | A1* | 4/2017 | Zalon | G10L 25/48 |
| 2017/0364520 | A1* | 12/2017 | Venkataraman | G06F 16/3329 |
| 2019/0080698 | A1* | 3/2019 | Miller | G10L 17/22 |
| 2019/0371328 | A1* | 12/2019 | Wang | G06F 21/64 |

* cited by examiner

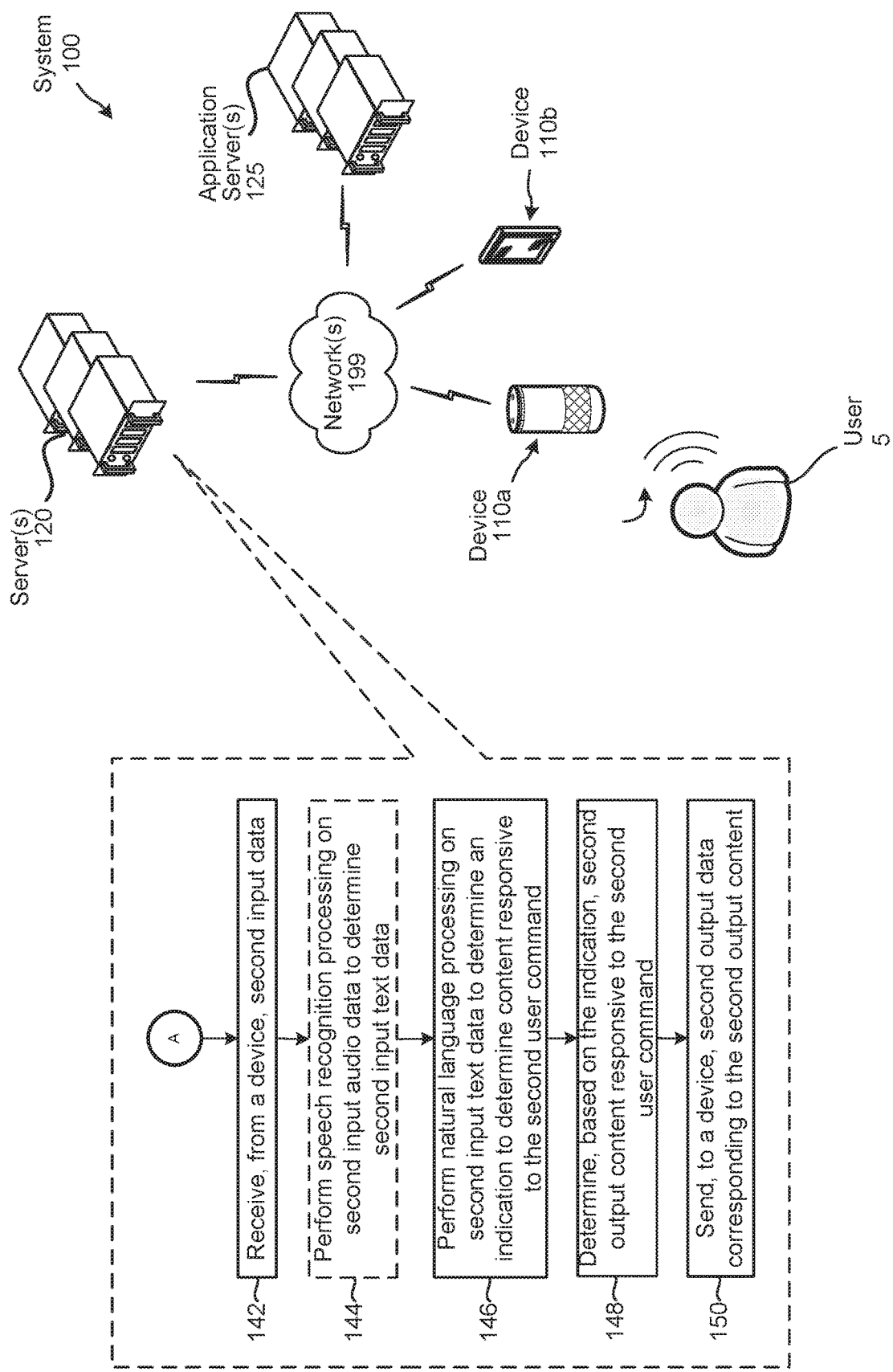

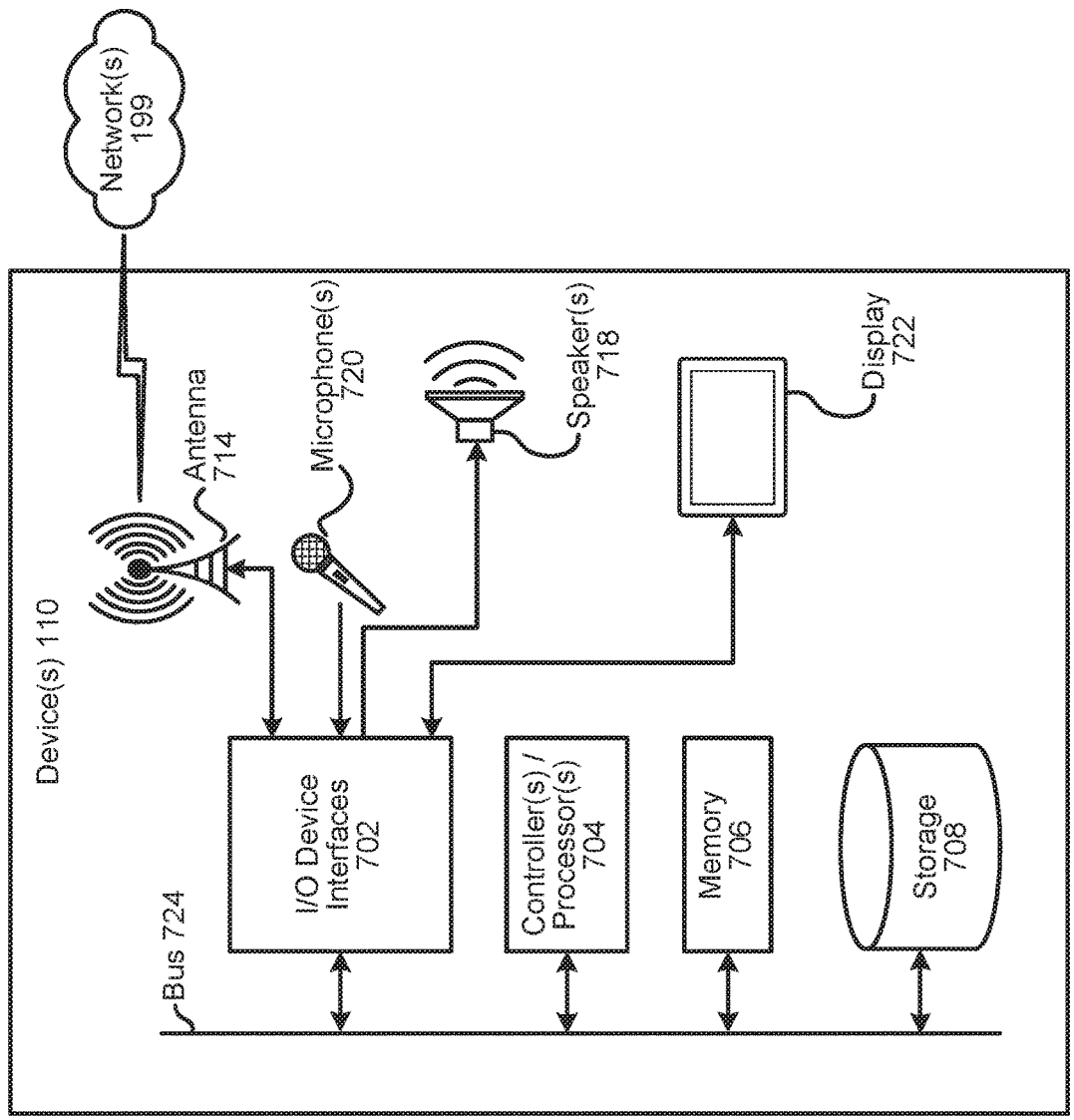

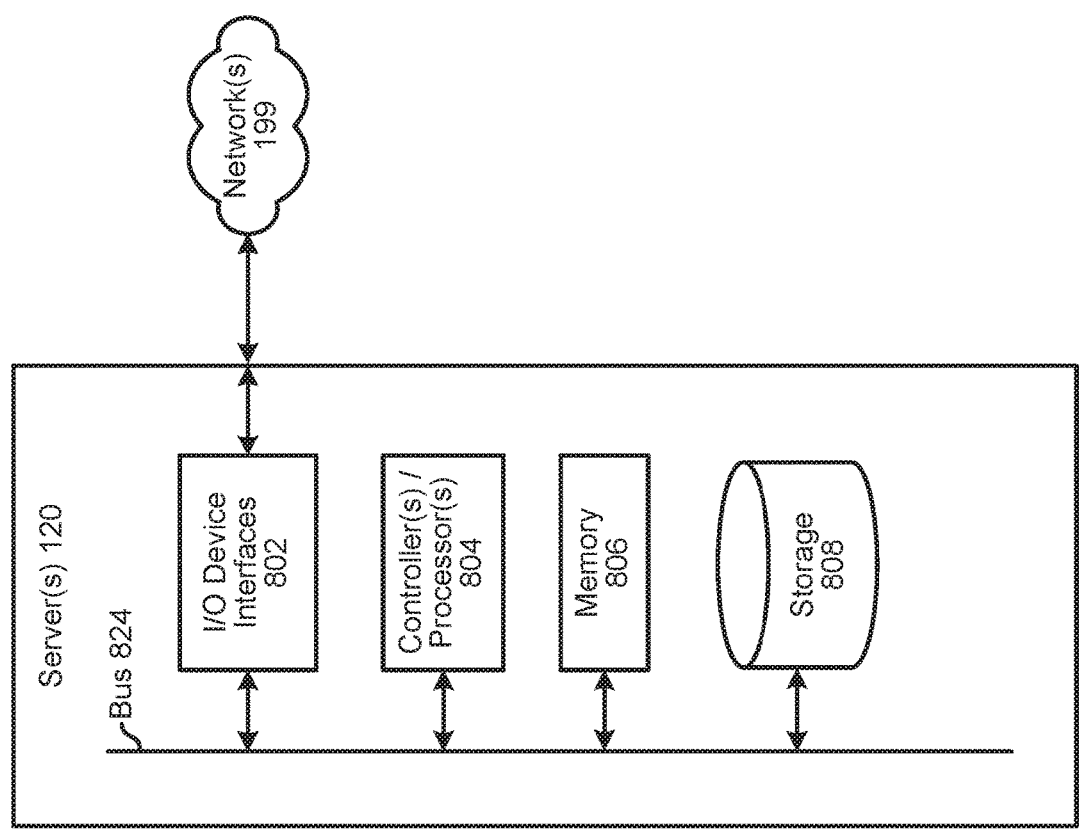

PROACTIVE COMMAND FRAMEWORK

CROSS REFERENCE TO RELATED APPLICATION

This application is a continuation of, and claims the benefit of priority of, U.S. Non-Provisional patent application Ser. No. 15/703,268, filed Sep. 13, 2017, and titled "PROACTIVE COMMAND FRAMEWORK", scheduled to issue as U.S. Pat. No. 10,395,655. The contents of which is expressly incorporated herein by reference in its entirety.

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 1A and 1B illustrate a system configured to proactively suggest subsequent system commands according to embodiments of the present disclosure.

FIG. 7 is a block diagram conceptually illustrating example components of a device according to embodiments of the present disclosure.

FIG. 8 is a block diagram conceptually illustrating example components of a server according to embodiments of the present disclosure.

DETAILED DESCRIPTION

Figure 1A:
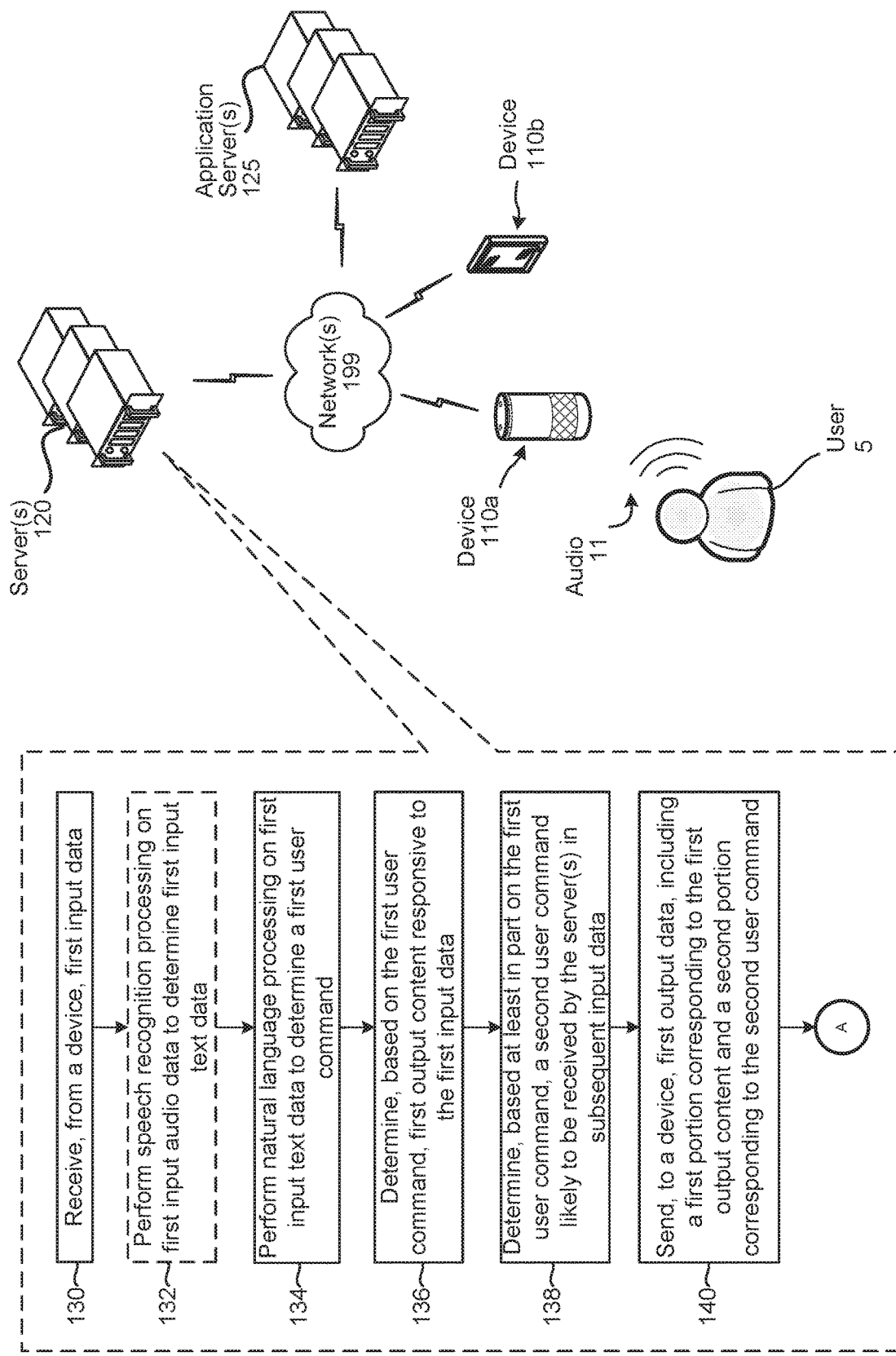

Automatic speech recognition (ASR) is a field of computer science, artificial intelligence, and linguistics concerned with transforming audio data associated with speech into text data representative of that speech. Similarly, natural language understanding (NLU) is a field of computer science, artificial intelligence, and linguistics concerned with enabling computers to derive meaning from text input containing natural language. Likewise, text-to-speech (TTS) is a field of computer science, artificial intelligence, and linguistics concerned with enabling computers to output synthesized speech. ASR, NLU, and TTS are often used together as part of a speech processing system.

A computing system may be configured to execute a command in response to user input, which may be in the form of a spoken utterance. For example, a user may speak "play some music." In response, the system may output music. If the user wants the system to thereafter execute another command, the user is required to provide a second input. For example, while the system is outputting the music, the user may speak "increase the volume." In response, the system may raise the volume at which the music is output. Thus, certain systems are configured to operate with respect to a specific user input, and are not configured to execute other commands until the user instructs the system accordingly.

The present disclosure improves upon such systems by determining a potential future user input, and indicating such to a user or simply providing output from a predicted input to the user without the user having to speak the input. This reduces the amount of friction between the user and the system. For example, if a user speaks "play some music," the system may, in response, output music as well as an indication soliciting the user as to whether the system should increase the volume at which the music is output.

To properly determine a potential future user input, the system may use supervised learning. For example, the system may map pairs of user inputs. Each pair may include a first user input and a second input, along with an indication of a likelihood that the second user input will be spoken after the first user input.

The likelihood may be based upon the first user input and the second user input being linked by functionality. For example, a pair of user inputs may include a first user input corresponding to a play music command and a second user input corresponding to a change volume command. The system may determine a likelihood that the change volume command will be spoken subsequent to the play music command based solely on both of the commands relating to the output of audio from the system. The likelihood may also be based on the first user input and the second user input being commonly related in time. For example, the first user input may correspond to a get the traffic command and the second user input may correspond to a get the weather command. The likelihood may further be based on one of the user inputs being used with respect to the other user input. For example, the first user input may correspond to a get a recipe command and the second user input may correspond to a start a timer command. Other user input pairings are possible.

The likelihood determined upon the natures of the user inputs may be altered based on other data, such as a history of user interactions with the system. For example, if the user routinely invokes the change volume command subsequent to the play music command, the system may increase the likelihood determined on the nature of the user inputs. Conversely, if the user rarely invokes the change volume command subsequent to the play music command, the system may decrease the likelihood determined on the nature of the user inputs. Other data may also be used to influence the likelihood determined on the nature of the user inputs.

FIGS. 1A and 1B show a system capable of proactively suggesting subsequent system commands to a user. Although the figures and discussion illustrate certain operational steps of the system in a particular order, the steps described may be performed in a different order (as well as certain steps removed or added) without departing from the intent of the disclosure. As shown in FIGS. 1A and 1B, the system may include one or more devices (110a/110b) local to a user 5, one or more servers 120, and one or more application servers 125 connected across one or more networks 199. The server(s) 120 (which may be one or more different physical devices) may be capable of performing speech processing (e.g., ASR and NLU) as well as non-speech processing operations as described herein. A single server 120 may perform all speech processing or multiple servers 120 may combine to perform all speech processing.

As shown in FIG. 1A, a device 110a may receive audio 11 including a spoken utterance of a user 5 via a microphone (or array of microphones) of the device 110a. The device 110a generates input audio data corresponding to the audio 11, and sends the input audio data to the server(s) 120 for processing. Alternatively, a device 110b may receive text input by the user 5 via either a physical keyboard or virtual keyboard presented on a touch sensitive display of the device 110b. The device 110b generates input text data corresponding to the text, and sends the input text data to the server(s) 120 for processing.

The system may be configured to perform the herein described techniques with respect to more than one "turn" of a user's conversation with the system. A turn refers to a user inputting a command to the system, the system processing the command, and the system outputting content responsive to the command to the user.

FIG. 1A illustrates the processing that may be performed with respect to a first turn of a conversation. As illustrated in FIG. 1A, the server(s) 120 receives (130) input data from a device (110a/110b). If the input data is the input audio data from the device 110a, the server(s) 120 performs (132) speech recognition processing (e.g., ASR) on the input audio data to generate input text data. The server(s) 120 performs (134) natural language processing (e.g., NLU) on input text data (either received from the device 110b or generated from the input audio data received from the device 110a) to determine a user command. A user command may correspond to a user request for the system to output content to the user. The requested content to be output may correspond to music, video, search results, weather information, etc. The requested content may also correspond to text used to generate TTS synthesized speech (as well as potentially the audio data corresponding to the TTS synthesized speech). The requested content may further correspond to one or more images to be displayed as part of a graphical user interface (GUI) presented on a display screen of a device.

The server(s) 120 determines (136) output content responsive to the user command. The output content may be received from a first party (1P) source (e.g., one controlled or managed by the server(s) 120) or a third party (3P) source (e.g., one managed by an application server(s) 125 in communication with the server(s) 120 but not controlled or managed by the server(s) 120).

The server(s) 120 also determines (138), based at least in part on the user command, a second user command likely to be received by the server(s) 120 in subsequent input data. For example, if the user command corresponds to "book me a plane ticket to Seattle," the second user command may correspond to "what is the weather in Seattle." This determination of the second command may be based on information available to the server(s) 120 that the second command (e.g., the weather request) is likely to be received following the first command (e.g., the plane ticket request).

The server(s) 120 sends (140), to a device (110a/110b) output data including a first portion corresponding to the output content responsive to the user command and a second portion corresponding to the second user command determined by the server(s) 120. The second portion corresponding to the second user command may include a prompt to the user as to whether the user wants the second command information (e.g., the weather report) or the second portion may actually include the information for the second command and thus may send the weather report to the device 110 for output, even absent a specific user request for the weather. The device (110/110b) may emit the output data as audio and/or present the output data on a display.

If the second portion includes a prompt for whether the user wants the weather report, the user may respond that s/he does. Thus, the device 110a may, thereafter, receive second audio including a spoken utterance of a user 5 via a microphone (or array of microphones) of the device 110a. The device 110a generates second input audio data corresponding to the second audio 11, and sends the second input audio data to the server(s) 120 for processing. Alternatively, the device 110b may receive second text input by the user 5. The device 110b generates second input text data corresponding to the second text, and sends the second input text data to the server(s) 120 for processing.

FIG. 1B illustrates the processing that may be performed with respect to a second turn of a conversation. As shown in FIG. 1B, the server(s) 120 receives (142) second input data from a device (110a/110b). If the second input data is the second input audio data from the device 110a, the server(s) 120 performs (144) speech recognition processing (e.g., ASR) on the second input audio data to generate second input text data. The server(s) 120 performs (146) natural language processing (e.g., NLU) on second input text data (either received from the device 110b or generated from the input audio data received from the device 110a) to determine an indication to determine content responsive to the second user command. According to the above example, the device (110a/110b) may indicate the plane ticket to Seattle has been booked as well as computer-generated speech corresponding to "do you want to know the weather in Seattle." Examples of indications representing the volume should be increased correspond to "yes," "what is the weather in Seattle," and the like.

The server(s) 120 determines (148), based on the indication, second output content responsive to the second user command. The second output content may be received from a 1P source or a 3P source. The server(s) 120 then sends (150) second output data corresponding to the second output content to a device (110a/110b).

Figure 2:
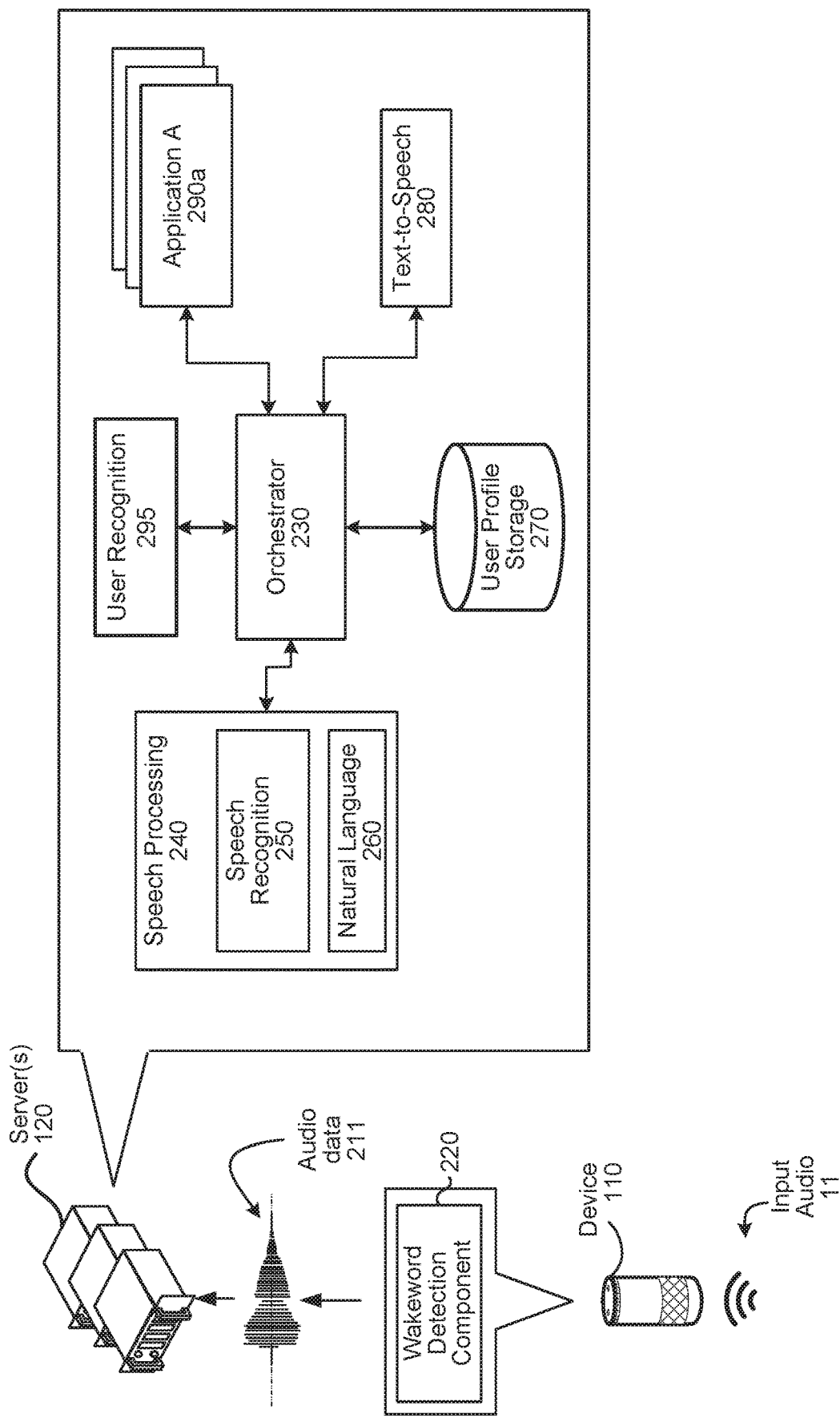
FIG. 2 is a diagram of components of a system according to embodiments of the present disclosure.

The system may operate using various components as illustrated in and described with respect to FIG. 2. The various components illustrated in FIG. 2 may be located on a same or different physical device. Communication between various components illustrated in FIG. 2 may occur directly or across a network(s) 199.

An audio capture component, such as a microphone or array of microphones of a device 110, captures the input audio 11 corresponding to a spoken utterance. The device 110, using a wakeword detection component 220, processes audio data corresponding to the input audio 11 to determine if a keyword (e.g., a wakeword) is detected in the audio data. Following detection of a wakeword, the device 110 sends audio data 211, corresponding to the utterance, to a server(s) 120 for processing.

Upon receipt by the server(s) 120, the audio data 211 may be sent to an orchestrator component 230. The orchestrator component 230 may include memory and logic that enable the orchestrator component 230 to transmit various pieces and forms of data to various components of the system.

The orchestrator component 230 sends the audio data 211 to a speech processing component 240. A speech recognition component 250 of the speech processing component 240 transcribes the audio data 111 into text data representing words of speech contained in the audio data 111. The speech recognition component 250 interprets the spoken utterance based on a similarity between the spoken utterance and pre-established language models. For example, the speech recognition component 250 may compare the audio data 111 with models for sounds (e.g., subword units or phonemes) and sequences of sounds to identify words that match the sequence of sounds spoken in the utterance of the audio data 111.

Results of speech recognition processing (i.e., text data representing speech) are processed by a natural language component 260 of the speech processing component 240. The natural language component 260 attempts to make a semantic interpretation of the text data. That is, the natural language component 260 determines the meaning behind the text data based on the individual words in the text data and then implements that meaning. The natural language component 260 interprets a text string to derive an intent or a desired action from the user as well as the pertinent pieces of information in the text data that allow a device (e.g., the device 110, the server(s) 120, the application server(s) 125, etc.) to complete that action. For example, if a spoken utterance is processed using the speech recognition component 250, which outputs the text data "call mom", the natural language component 260 may determine the user intended to activate a telephone in his/her device and to initiate a call with a contact matching the entity "mom."

The natural language component 260 may be configured to determine a "domain" corresponding to a type of processing associated with specific intents representing the utterance so as to determine and narrow down which functionality offered by an endpoint device (e.g., the server(s) 120 or the device 110) may be relevant. For example, an endpoint device may offer functionality relating to conducting telephone calls, a contact list, an electronic calendar, a music player, etc. Words in a single textual interpretation may implicate multiple functionality of an endpoint device, and some functionality may be linked (e.g., both telephone functionality and an electronic calendar may utilize data from a contact list).

The natural language component 260 may include a recognizer that includes a named entity resolution (NER) component configured to parse and tag to annotate text as part of natural language processing. For example, for the text "call mom," "call" may be tagged as a command to execute a phone call and "mom" may be tagged as a specific entity and target of the command. Moreover, the telephone number for the entity corresponding to "mom" stored in a contact list may be included in the NLU results. Further, the natural language component 260 may be used to provide answer data in response to queries, for example using a natural language knowledge base.

In natural language processing, a domain may represent a discrete set of activities having a common theme, such as "shopping," "music," "calendaring," "communications," etc. As such, each domain may be associated with a particular recognizer, language model and/or grammar database, a particular set of intents/actions, and a particular personalized lexicon. Each gazetteer may include domain-indexed lexical information associated with a particular user and/or device. A user's music-domain lexical information (e.g., a gazetteer associated with the user for a music domain) might correspond to album titles, artist names, and song names, for example, whereas a user's contact-list lexical information (e.g., a gazetteer associated with the user for a contact domain) might include the names of contacts. Since every user's music collection and contact list is presumably different, this personalized information improves entity resolution. A lexicon may represent what particular data for a domain is associated with a particular user. The form of the lexicon for a particular domain may be a data structure, such as a gazetteer. A gazetteer may be represented as a vector with many bit values, where each bit indicates whether a data point associated with the bit is associated with a particular user. For example, a music gazetteer may include one or more long vectors, each representing a particular group of musical items (such as albums, songs, artists, etc.) where the vector includes positive bit values for musical items that belong in the user's approved music list. Thus, for a song gazetteer, each bit may be associated with a particular song, and for a particular user's song gazetteer the bit value may be 1 if the song is in the particular user's music list. Other data structure forms for gazetteers or other lexicons are also possible.

As noted above, in traditional natural language processing, text data may be processed applying the rules, models, and information applicable to each identified domain. For example, if text represented in text data potentially implicates both communications and music, the text data may, substantially in parallel, be natural language processed using the grammar models and lexical information for communications, and natural language processed using the grammar models and lexical information for music. The responses based on the text data produced by each set of models is scored, with the overall highest ranked result from all applied domains being ordinarily selected to be the correct result.

A downstream process called named entity resolution actually links a text portion to an actual specific entity known to the system. To perform named entity resolution, the system may utilize gazetteer information stored in an entity library storage. The gazetteer information may be used for entity resolution, for example matching speech recognition results with different entities (e.g., song titles, contact names, etc.). Gazetteers may be linked to users (e.g., a particular gazetteer may be associated with a specific user's music collection), may be linked to certain domains (e.g., shopping, music, communications), or may be organized in a variety of other ways. The NER component may also determine whether a word refers to an entity that is not explicitly mentioned in the text data, for example "him," "her," "it" or other anaphora, exophora or the like.

A recognizer of the natural language component 260 may also include an intent classification (IC) component that processes text data to determine an intent(s), where the intent(s) corresponds to the action to be performed that is responsive to the user command represented in the text data. Each recognizer is associated with a database of words linked to intents. For example, a music intent database may link words and phrases such as "quiet," "volume off," and "mute" to a "mute" intent. The IC component identifies potential intents by comparing words in the text data to the words and phrases in the intents database. Traditionally, the IC component determines using a set of rules or templates that are processed against the incoming text data to identify a matching intent.

In order to generate a particular interpreted response, the NER component applies the grammar models and lexical information associated with the respective recognizer to recognize a mention of one or more entities in the text represented in the text data. In this manner the NER component identifies "slots" (i.e., particular words in text data) that may be needed for later command processing. Depending on the complexity of the NER component, it may also label each slot with a type (e.g., noun, place, city, artist name, song name, or the like). Each grammar model includes the names of entities (i.e., nouns) commonly found in speech about the particular domain (i.e., generic terms), whereas the lexical information from the gazetteer is personalized to the user(s) and/or the device. For instance, a grammar model associated with the shopping domain may include a database of words commonly used when people discuss shopping.

The intents identified by the IC component are linked to domain-specific grammar frameworks with "slots" or "fields" to be filled. Each slot/field corresponds to a portion of the text data that the system believes corresponds to an entity. For example, if "play music" is an identified intent, a grammar framework(s) may correspond to sentence structures such as "Play {Artist Name}," "Play {Album Name}," "Play {Song name}," "Play {Song name} by {Artist Name}," etc. However, to make resolution more flexible, these frameworks would ordinarily not be structured as sentences, but rather based on associating slots with grammatical tags.

For example, the NER component may parse the text data to identify words as subject, object, verb, preposition, etc., based on grammar rules and/or models, prior to recognizing named entities. The identified verb may be used by the IC component to identify intent, which is then used by the NER component to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER component then searches the corresponding fields in the domain-specific and personalized lexicon(s), attempting to match words and phrases in the text data tagged as a grammatical object or object modifier with those identified in the database(s).

This process includes semantic tagging, which is the labeling of a word or combination of words according to their type/semantic meaning. Parsing may be performed using heuristic grammar rules, or the NER component may be constructed using techniques such as HMMs, maximum entropy models, log linear models, conditional random fields (CRF), and the like.

For instance, a query of "play mother's little helper by the rolling stones" might be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the IC component will determine corresponds to the "play music" intent. At this stage, no determination has been made as to the meaning of "mother's little helper" and "the rolling stones," but based on grammar rules and models, it is determined that the text of these phrases relate to the grammatical object (i.e., entity) of the text data.

The frameworks linked to the intent are then used to determine what database fields should be searched to determine the meaning of these phrases, such as searching a user's gazette for similarity with the framework slots. So a framework for "play music intent" might indicate to attempt to resolve the identified object based on {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the slot/field using gazetteer information, the NER component may search a database of generic words associated with the domain. For example, if the text data corresponds to "play songs by the rolling stones," after failing to determine an album name or song name called "songs" by "the rolling stones," the NER component may search the domain vocabulary for the word "songs." In the alternative, generic words may be checked before the gazetteer information, or both may be tried, potentially producing two different results.

The results of natural language processing may be tagged to attribute meaning to the text data. So, for instance, "play mother's little helper by the rolling stones" might produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type} SONG.

The results of natural language processing may be sent to an application 290, which may be located on a same or separate server 120 as part of system. The system may include more than one application 290, and the destination application 290 may be determined based on the natural language processing results. For example, if the natural language processing results include a command to play music, the destination application 290 may be a music playing application, such as one located on the device 110 or in a music playing appliance, configured to execute a music playing command. If the natural language processing results include a search request (e.g., requesting the return of search results), the application 290 selected may include a search engine application, such as one located on a search server, configured to execute a search command and determine search results, which may include output text data to be processed by a text-to-speech engine and output from a device as synthesized speech.

The server(s) 120 may include a user recognition component 295. The user recognition component 295 may take as input the audio data 211 as well as the text data output by the speech recognition component 250. The user recognition component 295 may receive the text data from the speech recognition component 250 either directly or indirectly via the orchestrator component 230. Alternatively, the user recognition component 295 may be implemented as part of the speech recognition component 250. The user recognition component 295 determines respective scores indicating whether the utterance in the audio data 211 was spoken by particular users. The user recognition component 295 also determines an overall confidence regarding the accuracy of user recognition operations. User recognition may involve comparing speech characteristics in the audio data 211 to stored speech characteristics of users. User recognition may also involve comparing biometric data (e.g., fingerprint data, iris data, etc.) received by the user recognition component 295 to stored biometric data of users. User recognition may further involve comparing image data including a representation of at least a feature of a user with stored image data including representations of features of users. It should be appreciated that other kinds of user recognition processes, including those known in the art, may be used. Output of the user recognition component 295 may be used to inform natural language processing as well as processing performed by 1P and 3P applications 290.

The server(s) 120 may additionally include a user profile storage 270. The user profile storage 270 includes data regarding user accounts. As illustrated, the user profile storage 270 is implemented as part of the server(s) 120. However, it should be appreciated that the user profile storage 270 may be located proximate to the server(s) 120, or may otherwise be in communication with the server(s) 120, for example over the network(s) 199. The user profile storage 270 may include a variety of information related to individual users, accounts, etc. that interact with the system.

FIG. 2 illustrates various 1P applications 290 of the system. However, it should be appreciated that the data sent to the 1P applications 290 may also be sent to 3P application servers 125 executing 3P applications.

Application, as used herein, may be considered synonymous with a skill. A "skill" may correspond to a domain and may be software running on a server(s) 120 and akin to an application. That is, a skill may enable a server(s) 120 or application server(s) 125 to execute specific functionality in order to provide data or produce some other output called for by a user. The system may be configured with more than one skill. For example a weather skill may enable the server(s) 120 to execute a command with respect to a weather information provider server(s) 125, a car skill may enable the server(s) 120 to execute a command with respect to a taxi provider server(s) 125, an order pizza skill may enable the server(s) 120 to execute a command with respect to a restaurant server(s) 125, etc.

Output of the application/skill 290 may be in the form of text data to be conveyed to a user. As such, the application/skill output text data may be sent to a TTS component 280 either directly or indirectly via the orchestrator component 230. The TTS component 280 may synthesize speech corresponding to the received text data. Speech audio data synthesized by the TTS component 280 may be sent to a device 110 for output to a user.

The TTS component 280 may perform speech synthesis using one or more different methods. In one method of synthesis called unit selection, the TTS component 280 matches the text data or a derivative thereof against a database of recorded speech. Matching units are selected and concatenated together to form speech audio data. In another method of synthesis called parametric synthesis, the TTS component 280 varies parameters such as frequency, volume, and noise to create an artificial speech waveform output. Parametric synthesis uses a computerized voice generator, sometimes called a vocoder.

Figure 3:
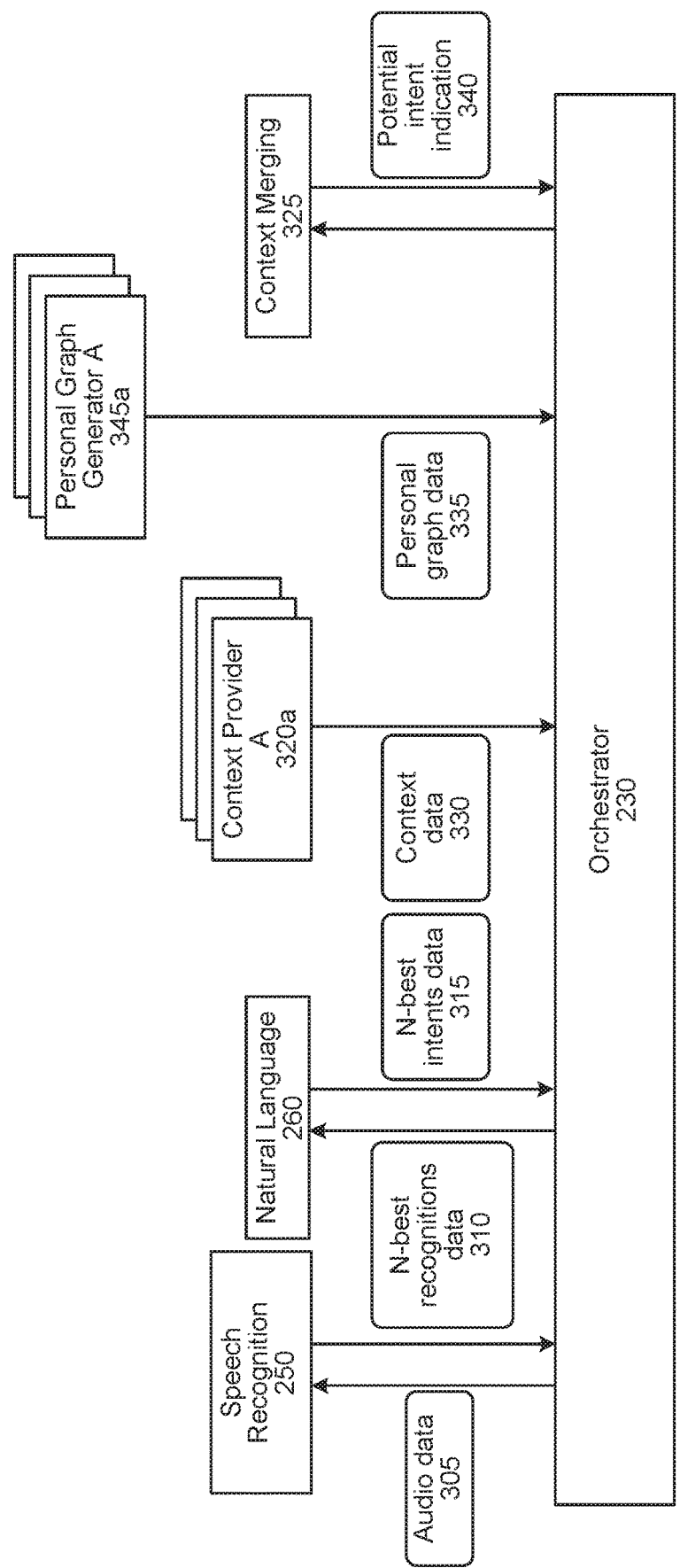
FIG. 3 is a diagram of components of a server(s) according to embodiments of the present disclosure.

The server(s) 120 may further operate using various components as illustrated in and described with respect to FIG. 3. The speech recognition component 250 receives audio data 305 from the orchestrator component 230. The speech recognition component 250 processes the audio data 305 to generate an N-best list of text possibly representing an utterance in the audio data 305. The speech recognition component 250 outputs N-best recognitions data 310, including text representing the generated N-best recognitions, to the orchestrator component 230.

The natural language component 260 receives the N-best recognitions data 310 from the orchestrator component 230. The natural language component 260 processes the N-best recognitions data 310 with respect to domains of the server(s) 120. Each domain may be associated with a separate recognizer implemented within the natural language component 260. A recognizer may include an NER component and an IC component as described above. The natural language component 260 outputs N-best intents data 315, representing an N-best list of the top scoring intents associated with the user command (as received by the server(s) 120 as either a spoken utterance or textual input), to the orchestrator component 230.

The server(s) 120 may further include one or more context providers 320. A context provider 320 may be configured to output non-user specific context data that may be used by a context merging component 325 to determine a potential future intent as described in detail herein below. The context provider(s) 320 may group and provide context data 330 so that further components of the system may have information regarding the circumstances of a present exchange between the user and the system. For example, a context provider 320 may be configured to output temporal information, such as a time of day. A context provider 320 may also be configured to output metadata associated with the device from which the user command was received. Examples of device metadata may include the type of device (e.g., car, phone, speaker, etc.) A context provider 320 may further be configured to output data indicating previously received user commands and their determined intents. A context provider 320 may also be configured to output information about currently trending entities and topics.

The server(s) 120 may additionally include one or more personal graph generator 345. A personal graph generator 345 may take as input a graph including pairs of intents, where a linkage between two intents represents a likelihood that a second intent of the pair will be invoked by a user subsequent to the user invoking the first intent of the pair. The graph, as received by the personal graph generator 345, may be untailored with respect to any given user. For example, the graph may include the following intent pairs with corresponding scores:

[0.345] <GetWeather>; <GetTraffic>
[0.217] <OrderPizza>; <PlayMovie>
[0.121] <PlayMusic>; <SetVolume>

Each pair of intents may be associated with a score indicating a likelihood that a user will consecutively invoke the intents of the pair. The scores across pairs may be normalized.

That is, the received graph may be configured based solely upon the natures of the intents or other system generated relationships of the intents that are not user-specific. For example, a pair of intents may include a first intent corresponding to <PlayMusic> and a second intent corresponding to <ChangeVolume>. The linkage between the <PlayMusic> intent and the <ChangeVolume> intent may represent a likelihood that a change volume intent will be invoked subsequent to a play music intent based solely on the first intent and the second intent both relating to output of audio from the system. For further example, a pair of intents may include a first intent corresponding to <BookPlaneTicket> and a second intent corresponding to <GetWeather>. The linkage between the <BookPlaneTicket> intent and the <GetWeather> intent may be generated based on users who by plane tickets often asking about the weather for their destination.

Linkages between intents in the unpersonalized graph input in the personal graph generator(s) 345 may be based on system user history across domains of the system from many different users. Pairing of the intents may be domain agnostic. Thus, both the first intent and the second intent of a pair of mapped intents may be associated with the same domain, or the first intent of the pair may be associated with a first domain while the second intent of the pair may be associated with a second domain. For example, a pair of mapped intents may include a <PlayMusic> intent and a <ChangeVolume> intent, where both the <PlayMusic> intent and the <ChangeVolume> intent correspond to a music domain. For further example, a pair of mapped intents may include a <BookPlaneTicket> intent and a <GetWeather> intent, where the <BookPlaneTicket> intent corresponds to a booking domain and the <GetWeather> intent corresponds to a weather domain. Pairing of the intents may also be agnostic with respect to the skills executing the intents. That is, both of the intents of a pair may be executed by a 1P skill (e.g., one controlled or managed by the server(s) 120), both of the intents of a pair may be executed by a 3P skill (e.g., one managed by an application server(s) 125 in communication with the server(s) 120 but not controlled or managed by the server(s) 120), or a first intent of a pair may be executed by a 1P skill while the second intent of the pair is executed by a 3P skill. For example, a pair of mapped intents may include a <PlayMusic> intent and a <ChangeVolume> intent, where both the <PlayMusic> intent and the <Change Volume> intent are executed by a 1P music streaming skill. For further example, a pair of mapped intents may include a <PlayMusic> intent and a <ChangeVolume> intent, where both the <PlayMusic> intent and the <Change Volume> intent are executed by a 3P music streaming skill. For further example, a pair of mapped intents may include a <BookPlaneTicket> intent and a <PlayMusic> intent, where the <BookPlaneTicket> intent is executed by a 3P skill and the <PlayMusic> intent is executed by a 1P skill.

The personal graph generator 345 may alter the pairings and/or associated likelihoods based on a history of user interactions with the system. For example, if the user routinely invokes the change volume intent subsequent to the play music intent, the personal graph generator 345 may increase the likelihood linking the change volume intent and the play music intent. Conversely, if the user rarely invokes the change volume intent subsequent to the play music intent, the system may decrease the likelihood linking the change volume intent and the play music intent.

The personal graph generator 345 may also alter the pairings and/or associated likelihoods based on the context data 330. For example, the context data may indicate a time of the calendar year (e.g., spring, summer, fall, winter, etc.). The time of day may be used to alter the likelihood that an intent will be subsequently invoked. For example, if the context data 330 indicates it is winter, such may be used to decrease a likelihood that a <GetGolfTeeTime> intent may be subsequently invoked. The personal graph generator 345 may use data other than user interaction history and time of year to alter the pairings and/or associated likelihoods.

The personal graph generator 345 may alter the pairings and/or associated likelihoods according to different hierarchies. The personal graph generator 345 may alter the pairings and/or associated likelihoods on a user level (e.g., based on a system interaction history specific to a user ID associated with a user from which the current command originated). The personal graph generator 345 may alternatively alter the pairings and/or associated likelihoods on a device level (e.g., based on a system interaction history specific to a device ID associated with the device from which data corresponding to the current command was received). The personal graph generator 345 may alternatively alter the pairings and/or associated likelihoods on a user and device level (e.g., based on a system interaction history specific to a user ID as well as a device ID).

The server(s) 120 additionally includes a context merging component 325. The content merging component 325 takes as input the N-best intents data 315, the context data 330, and the personal graph data 335. Therefrom, the context merging component 325 generates an indication 340 of a potential intent that may be invoked by the user following output of content responsive to the currently processed user command. That is, the content merging component 325 determines a possible intent that may be invoked by the user in response to output of content responsive to the currently executed intent. In some implementations, the context merging component 325 may output an N-best list of possible intents that may be subsequently invoked by the user. The N-best list may thereafter be parsed by a component of the server(s) 120 to determine a single possible intent that may be subsequently invoked.

The indication 340 may be a "do nothing" indication if the context merging component 325 is unable to determine an intent likely to be invoked by the user. The context merging component 325 may utilize thresholding to determine whether to output a "do nothing" indication or an indication representing a specific intent likely to be invoked by the user. For example, if the context merging component 325 determines one or more intents that may be invoked by the user, but none of the intents are associated with a confidence value satisfying (e.g., meeting or exceeding) a threshold, the context merging component 325 may output a "do nothing" indication. A "do nothing" indication causes the server(s) 120 to simply output content responsive to the currently processed user command, without any content representing a potential future intent.

The context merging component 325 may determine one or more intents that are likely to be invoked by the user subsequent to output of content responsive to a currently processed user command. For example, the context merging component 325 may determine one or more pairs of intents including a first intent corresponding to the intent of the currently processed user command, and various second intents corresponding to intents likely to be subsequently invoked by the user. The likelihood of an intent being subsequently invoked by the user may be a binned value (e.g., low, medium, high) or a discrete value (e.g., 0.1, 0.5, 0.8, etc.). The context merging component 325 may choose the highest scoring intent to be the intent most likely to be subsequently invoked by the user.

The indication 340 may represent the intent in various ways depending upon system configuration. The indication 340 may include text corresponding to an intent label, such as <GetWeather>, <ChangeVolume>, etc. The indication 340 may also or alternatively include text corresponding to the intent's identifier. Each intent of the system may be associated with a unique identifier. An intent unique identifier may correspond to the intent label appended with the domain with which the intent is associated.

The server(s) 120 may cause first content responsive to the currently processed user command to be output to the user. During or after the first content is output, the server(s) 120 may cause second content indicating the intent likely to be subsequently invoked to be output to the user. For example, a user may input a user command corresponding to "play Adele's latest album." The context merging component 325 may determine a <ChangeVolume> intent is likely to be invoked by the user while music is being output. Accordingly, the server(s) 120 may cause audio corresponding to Adele's latest album to be output and, shortly after commencing output of the audio, solicit the user as to whether the server(s) 120 should change the output volume of the audio. For further example, a user may input a user command corresponding to "what is the weather in Seattle." The context merging component 325 may determine a <TomorrowWeather> intent is likely to be invoked by the user subsequent to Seattle's current weather being output. Accordingly, the server(s) 120 may cause content corresponding to Seattle's current weather to be output and, thereafter, solicit the user as to whether the server(s) 120 should output Seattle's forecast for the next calendar day.

The solicitation may take the form of text output via a display of a user device or audio output by a speaker of a user device. The solicitation may be output by a device different from the device outputting the music. The indication 340 output by the context merging component 325 may be text data including text representing the intent likely to be subsequently invoked by the user. Accordingly, if the solicitation to the user is to be audio, the orchestrator component 230 may send the indication 340 to the TTS component 280, which may generate audio data based on the text data of the indication 340.

The context merging component 325 may also populate slots of a framework associated with the intent likely to be subsequently invoked. The context merging component 325 may populate the slots using data from a populated framework associated with the intent associated with the currently processed command. For example, a command of "book me a plane ticket from Boston to Seattle for July 5" may be associated with a <BookPlaneTicket> intent. The <BookPlaneTicket> intent may be associated with a framework including various slots including, for example, <DepartureDate>, <DepartureLocation>, <ArrivalDate>, and <DestinationLocation>. In the above example, the server(s) 120, namely the natural language component 260, may populate the framework as follows: <DepartureDate: July 5>, <DepartureLocation: Boston>, <ArrivalDate: July 5>, and <DestinationLocation: Seattle>. The context merging component 325 may determine it is likely that the user will subsequently issue a command associated with a <GetWeather> intent. The <GetWeather> intent may be associated with a framework including various slots including, for example, <Location> and <Date>. The context merging component 325 may use data of the current command's populated intent framework to populate the potential intent's framework. According to the above example, the context merging component 325 may populate the <GetWeather> intent framework as follows: <Location: Seattle> and <Date: July 5>. This enables the server(s) 120 to more quickly process the intent if the user indicates the intent should be processed. For example, according to the above example, the server(s) 120 could cause a device to indicate to a user that the requested ticket has been booked and, thereafter, solicit the user as to whether they want to know the weather for Seattle on July 5. If the user indicates the server(s) 120 should output such, the server(s) 120, namely the orchestrator component 230, may simply send the pre-populated <GetWeather> intent framework to downstream components so they may determine the weather. This increases a speed at which content responsive to the second intent may be output to a user as compared to the system having to perform natural language processing on the user's indication to process the second intent from scratch.

As described above, the server(s) 120 may execute an intent of the currently processed command and, only after receiving a user indication, execute an intent determined to be likely subsequently invoked by the user. The server(s) 120 may also or alternatively be configured to execute simultaneously, or near simultaneously, execute both the intent of the currently processed command and the intent likely to be subsequently invoked. For example, a user input a command to the system corresponding to "play Adele's latest album." The server(s) 120 may determine the command corresponds to a <PlayMusic> intent as well as determine it is likely that the user will subsequently invoke a <ChangeVolume> intent. The server(s) 120 may execute both the <PlayMusic> intent and the <ChangeVolume> intent, resulting in a device of the system outputting, for example, "want me to increase the volume before playing Adele's latest album." For further example, a user may input a command to the system corresponding to "book me a plane ticket from Boston to Seattle on July 5." The server(s) 120 may determine the command corresponds to a <BookPlaneTicket> intent as well as determine it is likely that the user will subsequently invoke a <GetWeather> intent. The server(s) 120 may execute both the <BookPlaneTicket> intent and the <GetWeather> intent, resulting in a device of the system outputting, for example, "I booked you a plane ticket from Boston to Seattle for July 5, the weather in Seattle on July 5 is projected to be sunny with a high of 80 degrees."

The personal graph generator 345 and the context merging component 325 may implement one or more machine learning models. A ground truth may be established for purposes of training the one or more machine learning models. In machine learning, the term "ground truth" refers to the accuracy of a training set's classification for supervised learning techniques.

Various machine learning techniques may be used to train and operate the personal graph generator 345 as well as the context merging component 325. Such techniques may include backpropagation, statistical learning, supervised learning, semi-supervised learning, stochastic learning, or other known techniques. Such techniques may more specifically include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

The user response to the content output by the system soliciting user instruction with respect to the likely to be invoked intent may be used to further train the machine learning model(s) of the personal graph server(s) 345 and/or the context merging component 325. Both user responses indicating the system should execute the likely to be invoked intent, as well as responses indicating the system should not execute the likely to be invoked intent, may be used to further train the machine learning model(s).

The context merging component 325 may be trained using previous instances where the intent suggestion was correct as well as previous instances where the intent suggestion was incorrect. That is, the context merging component 325 may take as input data indicating when the user instructed the system to execute the suggested intent as well as data indicating when the user instructed the system not to execute the suggested intent.

Figure 4:
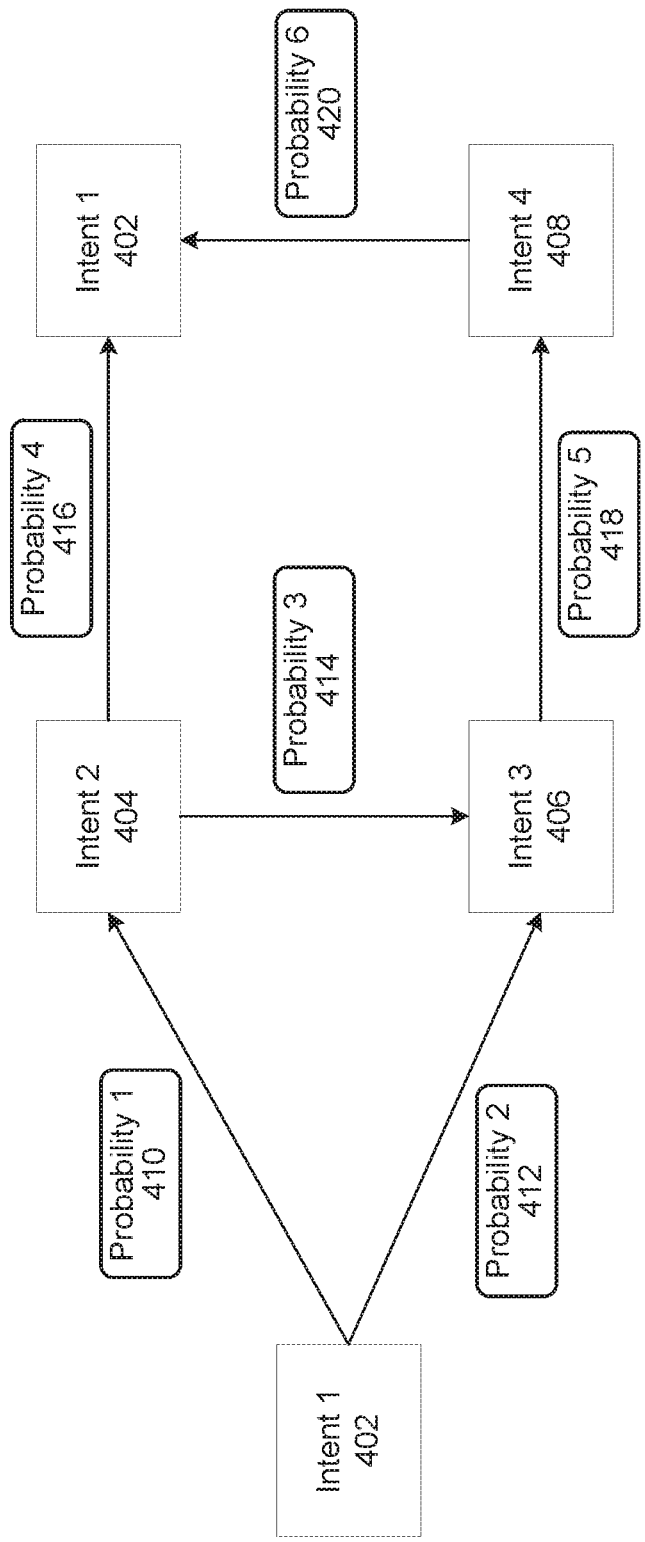
FIG. 4 illustrates a graph including pairs of intents linked by probabilities that a second intent in the pair will be subsequently invoked by a user.

As described above, a personal graph generator 345 may take as input as well as output a graph including pairs of intents with each linkage representing a likelihood that a second intent of the pair will be subsequently invoked by a user. FIG. 4 illustrates such a graph including pairs of intents linked by probabilities.

A first pair may include a first intent 402 and a second intent 404. The pair may be associated with a first probability that the second intent 404 will be invoked subsequently to the first intent 402. A second pair may include the first intent 402 and a third intent 406. The second pair may be associated with a second probability 412 that the third intent 406 will be invoked subsequently to the first intent 402. A third pair may include the second intent 404 and the third intent 406. The third pair may be associated with a third probability 414 that the third intent 406 will be invoked subsequently to the second intent 404. A fourth pair may include the second intent 404 and the first intent 402. The fourth pair may be associated with a fourth probability 416 that the first intent 402 will be invoked subsequently to the second intent 404. A fifth pair may include the third intent 406 and a fourth intent 408. The fifth pair may be associated with a fifth probability 418 that the fourth intent 408 will be invoked subsequently to the third intent 406. A sixth pair may include the fourth intent 408 and the first intent 402. The sixth pair may be associated with a sixth probability 420 that the first intent 402 will be invoked subsequently to the fourth intent 408. Other intent pairing and associated probability are also possible.

Figure 5:
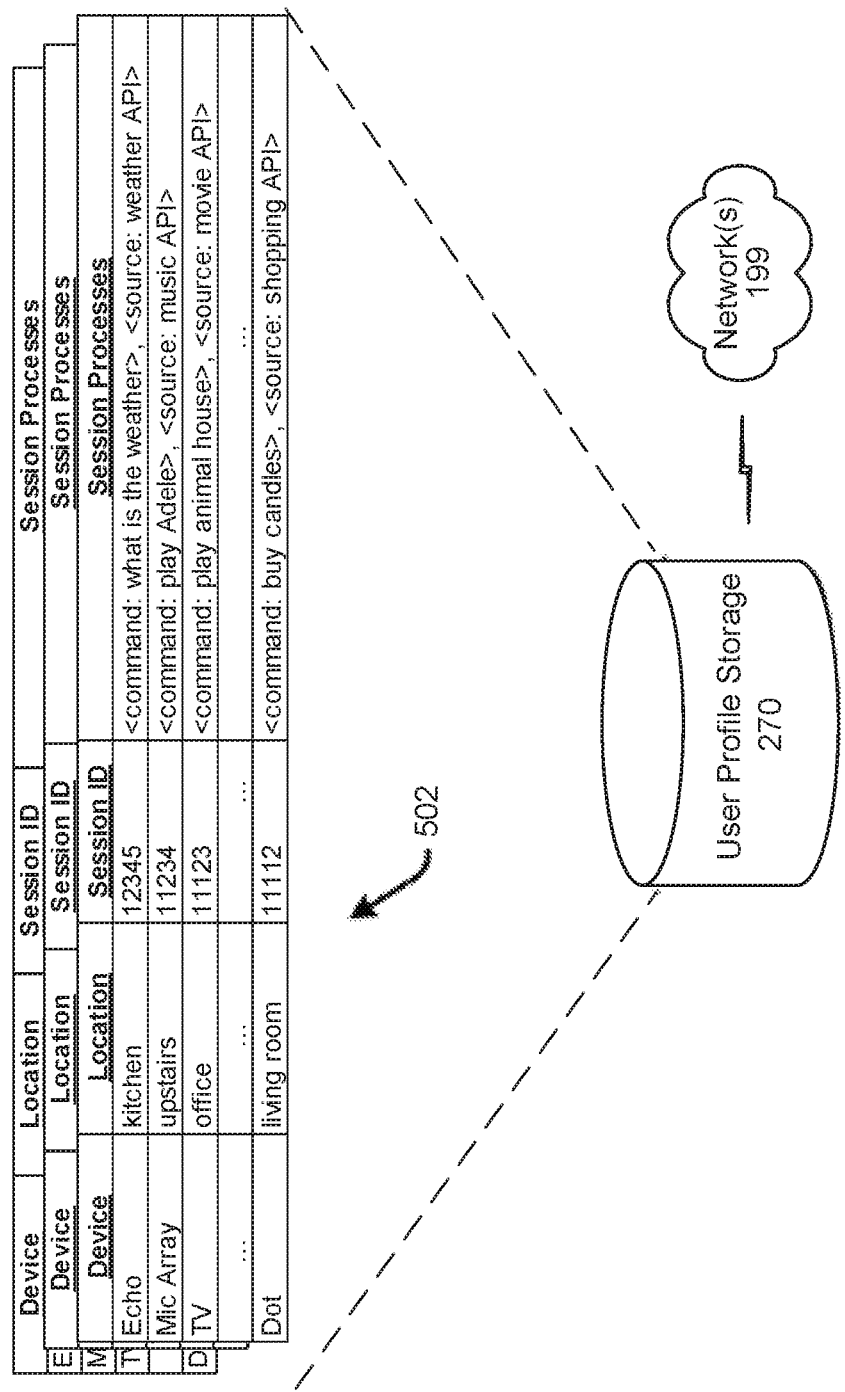
FIG. 5 illustrates data stored and associated with user profiles according to embodiments of the present disclosure.

FIG. 5 illustrates the user profile storage 270 that includes data regarding user accounts 502. For illustration, as shown in FIG. 5, each user profile 502 may include data such as device type information, device location information, session ID information, and processes performed with respect to each session ID. Each user profile 502 may also include intent pairs, with each pair including an intent invoked subsequent to another intent by a command of the user associated with the user profile 502. a user profile 502 may store other data as well.

Figure 6A:
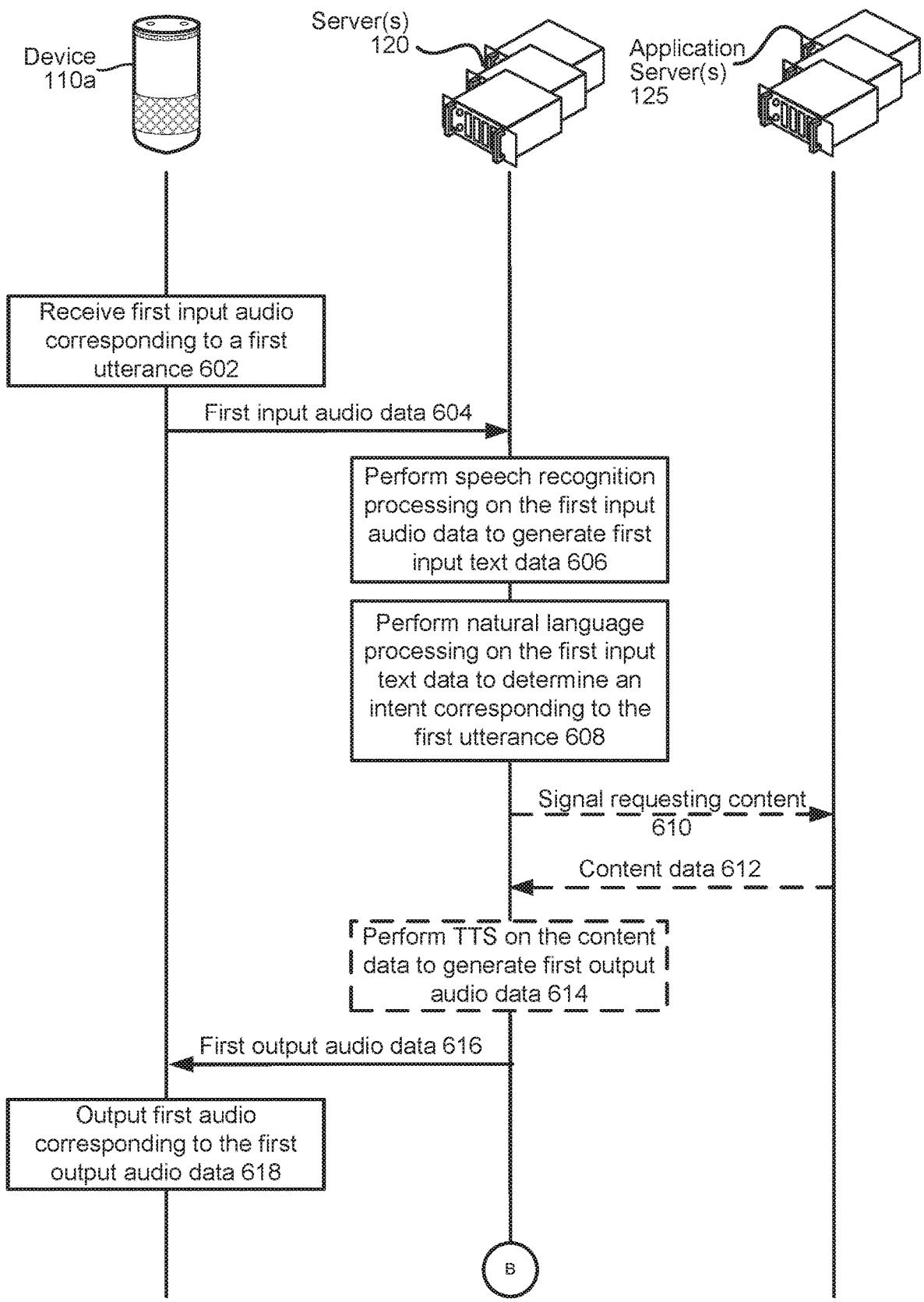
FIGS. 6A through 6C are a signal flow diagram illustrating the determination of an intent likely to be subsequently invoked by a user according to embodiments of the present disclosure.
Figure 6B:
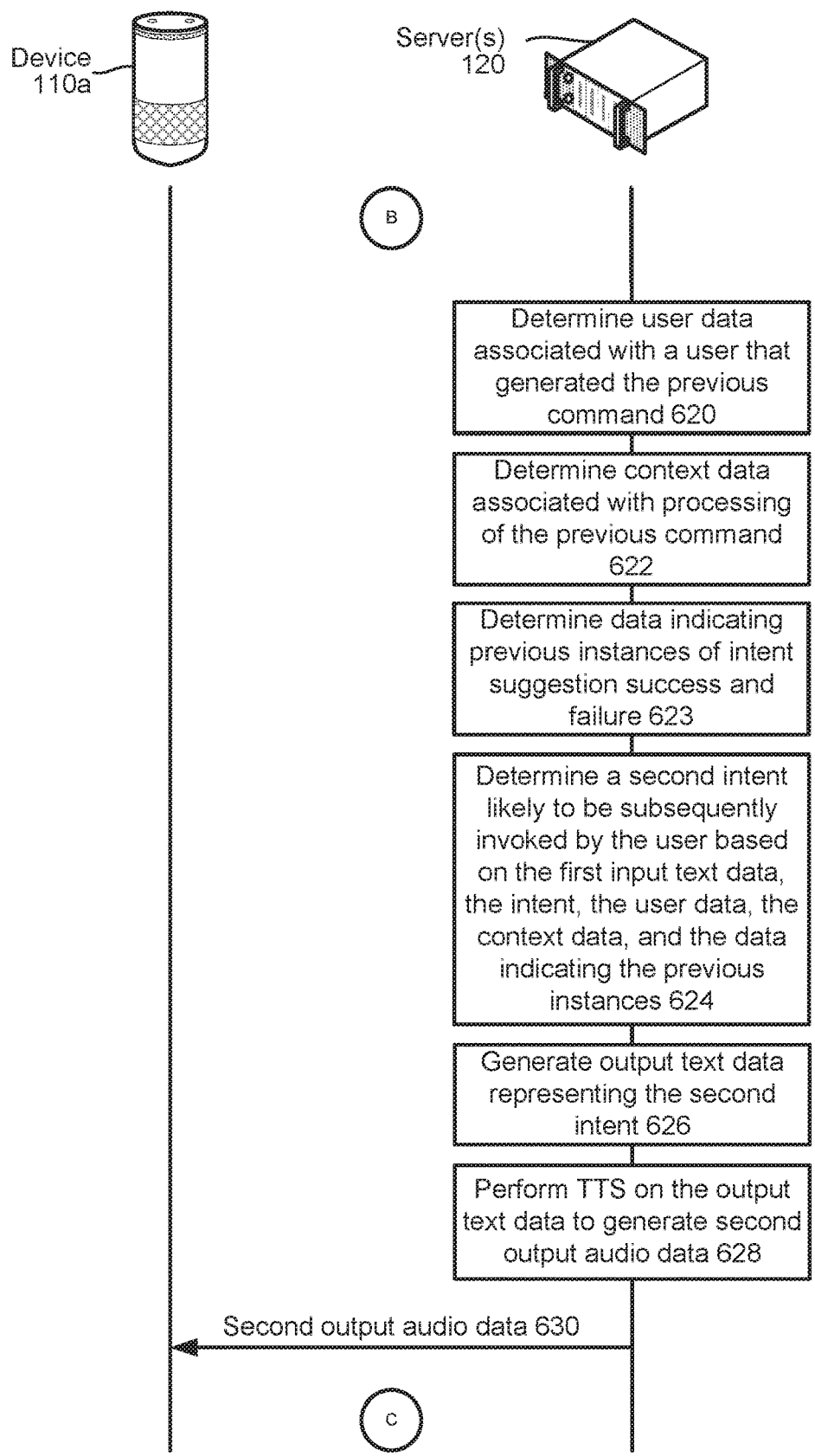
Figure 6C:
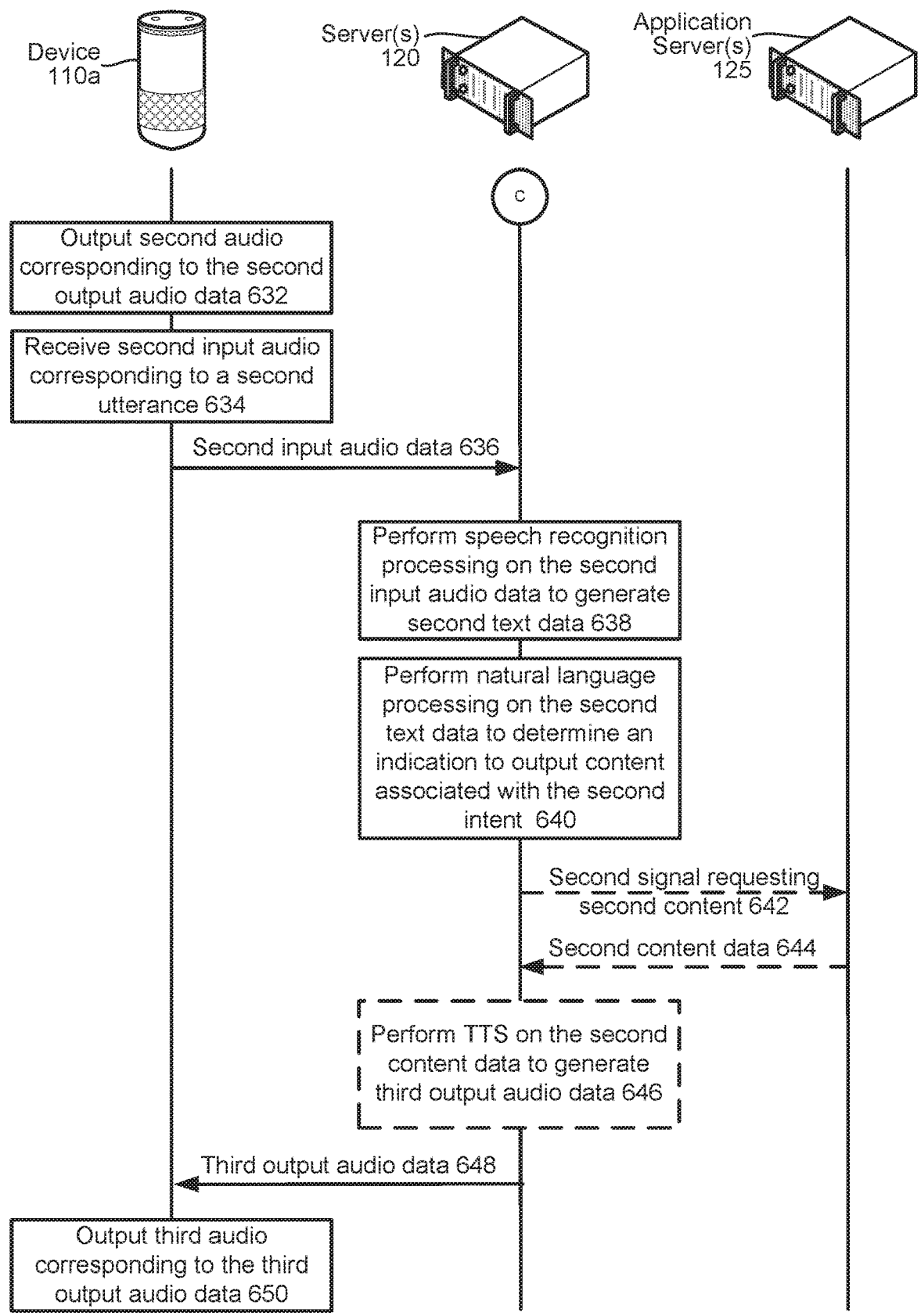

FIGS. 6A through 6C illustrate determination of an intent likely to be subsequently invoked by a user. A device 110a receives (602) input audio corresponding to an utterance of a user. The device 110a generates input audio data corresponding to the received input audio and sends (604) the input audio data to the server(s) 120 for processing. Alternatively, a device 110 may capture textual input corresponding to a command of the user, generate input text data based on the textual input, and send the input text data to the server(s) 120 for processing (not illustrated).

If the server(s) 120 receives input audio data, the server(s) 120 performs (606) speech recognition on the input audio data to generate input text data. The server(s) 120 also performs (608) natural language processing on the input text data (either generated by speech recognition processing or received from a device 110) to determine an intent of a user command represented in the utterance of the input audio or the textual input.

The server(s) determines content responsive to the command and determined intent. The content may be stored in a 1P source or a 3P source. If the content is stored by a 3P source, the server(s) 120 sends (610) a signal requesting the content to an application server(s) 125 and receives (612) content data from the application server(s) 125.

If the content data includes text data to be output to a user as synthesized speech, the server(s) 120 performs (614) TTS on the content data to generate output audio data including synthesized speech corresponding to the content. The server(s) 120 sends (616) output audio data to the user device 110a. The output audio data may be generated by TTS processing or may be received from the application server(s) 125 as audio data. The device 110a outputs (618) audio corresponding to the output audio data.

The server(s) 120 determines (620) user data associated with the user that either spoke the utterance or generated the textual input. The server(s) 120 also determines (622) context data associated with processing of the previous user command. The server(s) 120 may further determine (623) data indicating previous instances of intent suggestion success and failure. That is, the data may indicate when the user previously instructed the system to execute a suggested intent as well as when the user previously instructed the system not to execute a suggested intent. The server(s) 120 determines (624) an intent likely to be subsequently invoked by the user based on the input text data associated with the previous command, the intent associated with the previous command, the user data, the context data, and the data indicating the previous instances of intent suggestion success and failure. For a 1P application, the server(s) 120 may determine the second intent prior to determining a 1P application 290 configured to execute the intent. For a 3P application, the server(s) 120 may determine a 3P application prior to determine the second intent that may be performed by the 3P application.

The server(s) 120 generates (626) output text data representing the intent likely to be subsequently invoked by the user. The server(s) 120 may send the output text data to a user device 110 if text of the output text data is to be displayed to a user (not illustrated). Alternatively, the server(s) 120 may perform (628) TTS on the output text data to generate further output audio data containing computerized speech at least partially representing the intent likely to be subsequently invoked by the user. The server(s) 120 sends (630) the output audio data to the device 110a, and the device 110a outputs (632) further audio corresponding to the output audio data.

The device 110a receives (634) further input audio corresponding to another utterance of a user. The device 110a generates input audio data corresponding to the received additional input audio and sends (636) the input audio data to the server(s) 120 for processing. Alternatively, a device 110 may capture additional textual input corresponding to a command of the user, generate input text data based on the textual input, and send the input text data to the server(s) 120 for processing (not illustrated).

If the server(s) 120 receives input audio data, the server(s) 120 performs (638) speech recognition on the input audio data to generate input text data. The server(s) 120 also performs (640) natural language processing on the input text data (either generated by speech recognition processing or received from a device 110) to determine an indication to output content associated with the intent that was determined to be likely subsequently invoked by the user.

In response to the indication, the server(s) determines additional content responsive to the second intent based on the processing of the first command and intent. The additional content may be stored in a 1P source or a 3P source. If the additional content is stored by a 3P source, the server(s) 120 sends (642) a signal requesting the additional content to an application server(s) 125 and receives (644) additional content data from the application server(s) 125.

If the additional content data includes text data to be output to a user as synthesized speech, the server(s) 120 performs (646) TTS on the additional content data to generate additional output audio data including synthesized speech corresponding to the additional content. The server(s) 120 sends (648) additional output audio data to the user device 110*a*. The additional output audio data may be generated by TTS processing or may be received from the application server(s) 125 as audio data. The device 110*a* outputs (650) additional audio corresponding to the additional output audio data.

FIG. 7 is a block diagram conceptually illustrating a user device 110 that may be used with the described system. FIG. 8 is a block diagram conceptually illustrating example components of a remote device, such as the server(s) 120 that may assist with speech recognition processing, natural language processing, or command processing. Multiple servers 120 may be included in the system, such as one server 120 for performing speech recognition, one server 120 for performing natural language, etc. In operation, each of these devices (or groups of devices) may include computer-readable and computer-executable instructions that reside on the respective device (110/120), as will be discussed further below.

Each of these devices (110/120) may include one or more controllers/processors (704/804), which may each include a central processing unit (CPU) for processing data and computer-readable instructions, and a memory (706/806) for storing data and instructions of the respective device. The memories (706/806) may individually include volatile random access memory (RAM), non-volatile read only memory (ROM), non-volatile magnetoresistive memory (MRAM), and/or other types of memory. Each device (110/120) may also include a data storage component (708/808) for storing data and controller/processor-executable instructions. Each data storage component (708/808) may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (702/802).

Computer instructions for operating each device (110/120) and its various components may be executed by the respective device's controller(s)/processor(s) (704/804), using the memory (706/806) as temporary "working" storage at runtime. A device's computer instructions may be stored in a non-transitory manner in non-volatile memory (706/806), storage (708/808), or an external device(s). Alternatively, some or all of the executable instructions may be embedded in hardware or firmware on the respective device (110/120) in addition to or instead of software.

Each device (110/120) includes input/output device interfaces (702/802). A variety of components may be connected through the input/output device interfaces (702/802), as will be discussed further below. Additionally, each device (110/120) may include an address/data bus (724/824) for conveying data among components of the respective device. Each component within a device (110/120) may also be directly connected to other components in addition to (or instead of) being connected to other components across the bus (724/824).

Referring to FIG. 7, the device 110 may include input/output device interfaces 702 that connect to a variety of components such as an audio output component such as a speaker 704, a wired headset or a wireless headset (not illustrated), or other component capable of outputting audio. The device 110 may also include an audio capture component. The audio capture component may be, for example, a microphone 820 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may further include a display 722 configured to display content.

Via antenna(s) 714, the input/output device interfaces 702 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (702/802) may also include communication components that allow data to be exchanged between devices such as different physical servers in a collection of servers or other components.

The components of the device(s) 110 and the server(s) 120 may include their own dedicated processors, memory, and/or storage. Alternatively, one or more of the components of the device(s) 110 and the server(s) 120 may utilize the I/O interfaces (702/802), processor(s) (704/804), memory (706/806), and/or storage (708/808) of the device(s) 110 and server(s) 120, respectively. Thus, the speech recognition component 250 may have its own I/O interface(s), processor, memory, and/or storage, the natural language component 260 may have its own I/O interface(s), processor, memory, and/or storage, and so forth for the various components discussed herein.

As noted above, multiple devices may be employed in a single system. In such a multi-device system, each of the devices may include different components for performing different aspects of the system's processing. The multiple devices may include overlapping components. The components of the device(s) 110 and the server(s) 120, as illustrated in FIGS. 7 and 8, are exemplary, and may be located as a stand-alone device or may be included, in whole or in part, as a component of a larger device or system.

Figure 9:
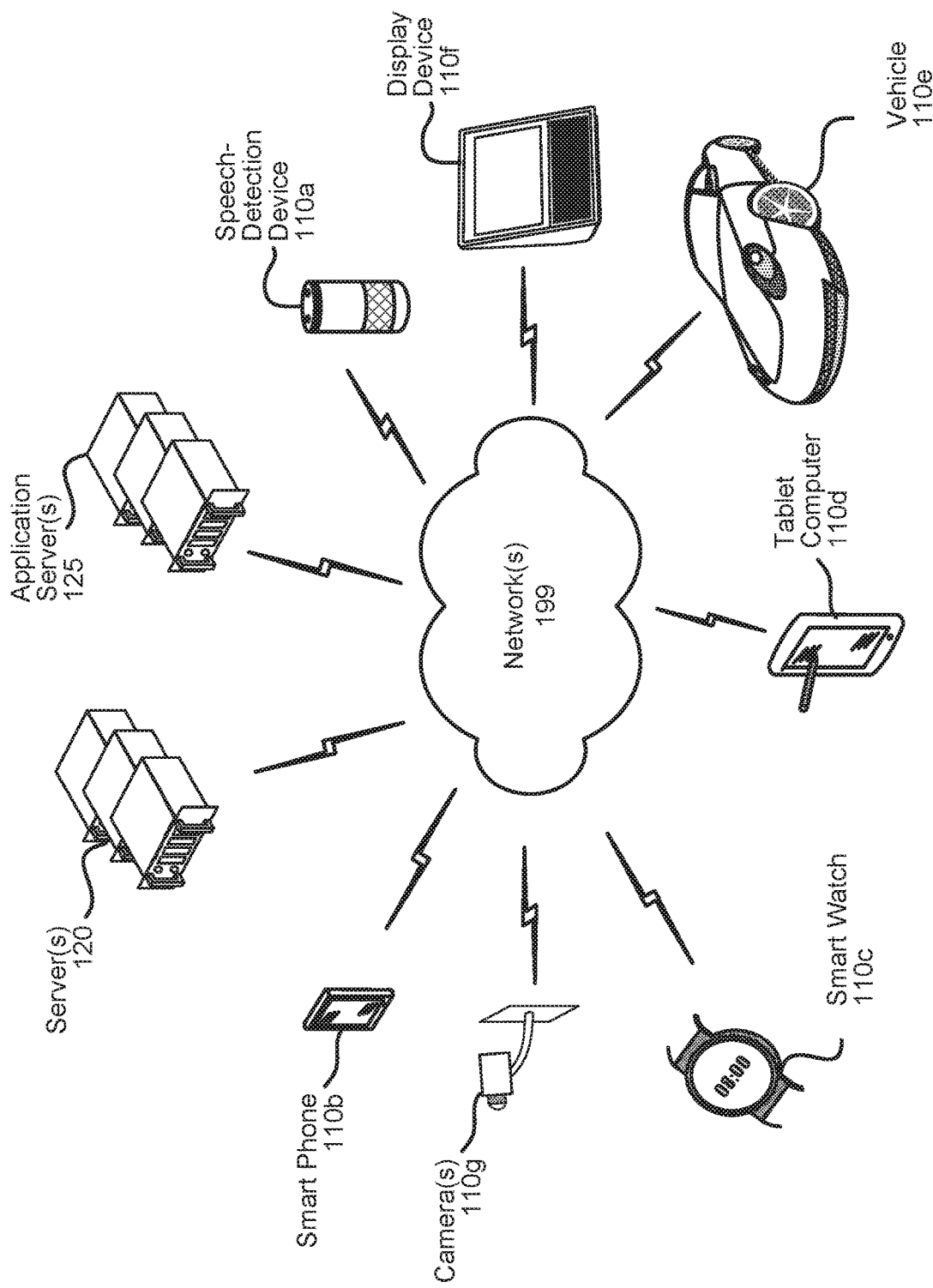
FIG. 9 illustrates an example of a computer network for use with the system.

As illustrated in FIG. 9, multiple devices (110*a*-110*g*, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110*a*, a smart phone 110*b*, a smart watch 110*c*, a tablet computer 110*d*, a vehicle 110*e*, a display device 110*f*, and/or a camera(s) 110*g* may be connected to the network(s) 199 through a wireless service provider, over a WiFi or cellular network connection, or the like. Other devices are included as network-connected support devices, such as the server(s) 120, the application server(s) 125, or others. The support devices may connect to the network(s) 199 through a wired connection or wireless connection. Networked devices may capture audio using one-or-more built-in or connected microphones or other audio capture devices, with processing performed by speech recognition, natural language, or other components of the same device or another device connected via the network(s) 199, such as the speech recognition component 250, the natural language component 260, etc. of one or more servers 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of one or more of the modules and engines may be implemented as in firmware or hardware, such as the AFE 220, which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A system for processing a user command and predicting when another user command is likely to be received, the system comprising:
   at least one processor; and
   at least one memory comprising instructions that, when executed by the at least one processor, cause the system to:
      receive first data corresponding to a first user command;
      determine second data responsive to the first user command;
      determine system interaction history data representing at least one instance when a second user command was received after the first user command was received;
      based at least in part on the system interaction history data, determine third data corresponding to the second user command;
      send, to a first device, the second data for output; and
      prior to receiving the second user command, send, to the first device, the third data for output.

2. The system of claim 1, wherein the at least one memory further comprises instructions that, when executed by the at least one processor, further cause the system to:
   determine a user identifier associated with the first user command,
   wherein the system interaction history data represents a plurality of previous user commands associated with the user identifier.

3. The system of claim 1, wherein the at least one memory further comprises instructions that, when executed by the at least one processor, further cause the system to:
   determine a device identifier associated with the first user command,
   wherein the system interaction history data represents a plurality of previous user commands associated with the device identifier.

4. The system of claim 1, wherein the third data requests confirmation that the second user command is to be performed.

5. The system of claim 1, wherein the third data includes content responsive to the second user command.

6. The system of claim 1, wherein the at least one memory further comprises instructions that, when executed by the at least one processor, further cause the system to:
   receive fourth data corresponding to a third user command;
   determine fifth data responsive to the third user command;
   determine second system interaction history data;
   based at least in part on the second system interaction history data, determine a probability that a fourth user command will be received after the fifth data is output;
   determine the probability fails to satisfy a threshold probability;

based at least in part on determining the probability fails to satisfy the threshold probability, determine the fourth user command is unlikely to be received; and send, to the first device, the fifth data for output.

7. The system of claim 1, wherein the at least one memory further comprises instructions that, when executed by the at least one processor, further cause the system to:

determine first intent data representing the first user command; and determine the system interaction history data represents the first intent data being associated with second intent data representing the second user command, wherein the third data is further determined based at least in part on the system interaction history data representing the first intent data is associated with the second intent data.

8. The system of claim 7, wherein the first data is audio data, the first user command comprises speech, and the at least one memory further comprises instructions that, when executed by the at least one processor, further cause the system to:

generate text data representing the speech, wherein the first intent data is determined using the text data.

9. The system of claim 1, wherein the at least one memory further comprises instructions that, when executed by the at least one processor, further cause the system to:

determine time data representing when the first data was received; and determine the at least one instance is associated with the time data, wherein the third data is further determined based at least in part on determining the at least one instance is associated with the time data.

10. The system of claim 1, wherein:

the first user command is associated with a first domain; and the second user command is associated with a second domain.

11. A method for processing a user command and predicting when another user command is likely to be received, the method comprising:

receiving first data corresponding to a first user command;

determining second data responsive to the first user command;

determining system interaction history data representing at least one instance when a second user command was received after the first user command was received;

based at least in part on the system interaction history data, determining third data corresponding to the second user command;

sending, to a first device, the second data for output; and prior to receiving the second user command, sending, to the first device, the third data for output.

12. The method of claim 11, further comprising:

determining a user identifier associated with the first user command, wherein the system interaction history data represents a plurality of previous user commands associated with the user identifier.

13. The method of claim 11, further comprising:

determining a device identifier associated with the first user command, wherein the system interaction history data represents a plurality of previous user commands associated with the device identifier.

14. The method of claim 11, wherein the third data requests confirmation that the second user command is to be performed.

15. The method of claim 11, wherein the third data includes content responsive to the second user command.

16. The method of claim 11, further comprising:

receiving fourth data corresponding to a third user command;

determining fifth data responsive to the third user command;

determining second system interaction history data;

based at least in part on the second system interaction history data, determining a probability that a fourth user command will be received after the fifth data is output;

determining the probability fails to satisfy a threshold probability;

based at least in part on determining the probability fails to satisfy the threshold probability, determining the fourth user command is unlikely to be received; and sending, to the first device, the fifth data for output.

17. The method of claim 11, further comprising:

determining first intent data representing the first user command; and determining the system interaction history data represents the first intent data being associated with second intent data representing the second user command, wherein the third data is further determined based at least in part on the system interaction history data representing the first intent data is associated with the second intent data.

18. The method of claim 17, wherein the first data is audio data, the first user command comprises speech, and the method further comprises:

generating text data representing the speech, wherein the first intent data is determined using the text data.

19. The method of claim 11, further comprising:

determining a time data representing when the first data was received; and determining the at least one instance is associated with the time data, wherein the third data is further determined based at least in part on determining the at least one instance is associated with the time data.

20. The method of claim 11, wherein:

the first user command is associated with a first domain; and the second user command is associated with a second domain.

* * * * *